US010393393B2

(12) United States Patent
Fukuhara et al.

(10) Patent No.: US 10,393,393 B2
(45) Date of Patent: Aug. 27, 2019

(54) DEHUMIDIFIER (71) Applicant: Mitsubishi Electric Corporation, Tokyo (JP)

(72) Inventors: Keizo Fukuhara, Tokyo (JP); Keigo Okajima, Tokyo (JP); Manabu Tanaka, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 245 days.

(21) Appl. No.: 15/327,695

(22) PCT Filed: Sep. 26, 2014

(86) PCT No.: PCT/JP2014/075716
§ 371 (c)(1),
(2) Date: Jan. 20, 2017

(87) PCT Pub. No.: WO2016/046982
PCT Pub. Date: Mar. 31, 2016

(65) Prior Publication Data
US 2017/0205089 A1    Jul. 20, 2017

(51) Int. Cl.
*F24F 3/14* (2006.01)
*F24F 11/89* (2018.01)
*F24F 11/30* (2018.01)
*B01D 53/04* (2006.01)
*B01D 53/26* (2006.01)
(Continued)

(52) U.S. Cl.
CPC ........ *F24F 3/1411* (2013.01); *B01D 53/0438* (2013.01); *B01D 53/0454* (2013.01);
(Continued)

(58) Field of Classification Search
CPC ........ F24F 3/1411; F24F 13/222; F24F 3/001; B01D 53/0454
See application file for complete search history.

(56) References Cited

U.S. PATENT DOCUMENTS 4,332,141 A * 6/1982 Mueller ................. F25D 21/02
62/140
2014/0230479 A1   8/2014 Ito et al.
2014/0250930 A1   9/2014 Unezaki et al.

FOREIGN PATENT DOCUMENTS

CN   101509682 A   8/2009
CN   103889550 A   6/2014
(Continued)

OTHER PUBLICATIONS

Unezaki et al., Dehumidifier, May 2, 2013, WO2013061829A1, Whole Document.*

(Continued)

*Primary Examiner* — Larry L Furdge
(74) *Attorney, Agent, or Firm* — Posz Law Group, PLC (57) ABSTRACT A dehumidifier includes a compressor, a flow path switch, a first heat exchanger, a pressure-reducing device, a second heat exchanger, a moisture adsorption member that is arranged between the first heat exchanger and the second heat exchanger, a fan, a storage unit configured to store an operation time map, and a temperature and humidity detection unit. The controller controls the flow path switch that switches a first operation mode to adsorb moisture by the moisture adsorption member and a second operation mode to desorb moisture adsorbed by the moisture adsorption member. The controller acquires a first time and a second time corresponding to the temperature and humidity detected by the temperature and humidity detection unit from the operation time map, and controls the flow path switch in accordance with the acquired first time and second time.

9 Claims, 7 Drawing Sheets (51) Int. Cl.
- *F24F 3/00* (2006.01)
- *F24F 13/22* (2006.01)
- *F24F 110/20* (2018.01)
- *F24F 110/30* (2018.01)
- *F24F 110/10* (2018.01)
- *F24F 11/61* (2018.01)

(52) U.S. Cl.
CPC ............ *B01D 53/261* (2013.01); *F24F 3/001* (2013.01); *F24F 3/14* (2013.01); *F24F 11/30* (2018.01); *F24F 11/89* (2018.01); *F24F 13/222* (2013.01); *B01D 2253/102* (2013.01); *B01D 2253/106* (2013.01); *B01D 2253/108* (2013.01); *B01D 2253/202* (2013.01); *B01D 2257/80* (2013.01); *B01D 2258/06* (2013.01); *B01D 2259/40088* (2013.01); *B01D 2259/40098* (2013.01); *F24F 11/61* (2018.01); *F24F 2003/1458* (2013.01); *F24F 2110/10* (2018.01); *F24F 2110/20* (2018.01); *F24F 2110/30* (2018.01); *F24F 2203/021* (2013.01)

(56) References Cited

FOREIGN PATENT DOCUMENTS

| | | | |
|---|---|---|---|
| CN | 105899882 A | 8/2016 | |
| GB | 2525112 A | 10/2015 | |
| JP | S63209700 A | * | 8/1988 |
| JP | 04-309731 A | | 11/1992 |
| JP | 4649967 B | | 6/2006 |
| JP | 2011-012876 A | | 1/2011 |
| JP | 2011-047581 A | | 3/2011 |
| JP | 2012-245501 A | | 12/2012 |
| JP | 2013-094681 A | | 5/2013 |
| JP | WO2013061829 A1 | * | 5/2013 |
| NZ | 570587 A | | 10/2009 |
| WO | 2012-077201 A1 | | 6/2012 |
| WO | 2013/061377 A | | 5/2013 |
| WO | 2014/118871 A1 | | 8/2014 |

OTHER PUBLICATIONS

Nishikawa et al., Heat Pump Type Dryer, Aug. 31, 1988, JPS63209700A, Whole Document.*
Office Action dated Oct. 19, 2018 issued in corresponding CN patent application No. 201480080802.6 (and English translation).
International Search Report of the International Searching Authority dated Apr. 21, 2015 for the corresponding nternational application No. PCT/JP2014/075716 (and English translation).
Office Action dated Aug. 15, 2017 issued in corresponding JP patent application No. 2016-549882 (and English translation).
Office action dated May 8, 2019 issued in corresponding CN patent application No. 201480080802.6 (and English translation thereof).

* cited by examiner

DEHUMIDIFIER

CROSS REFERENCE TO RELATED APPLICATION

This application is a U.S. national stage application of PCT/JP2014/075716 filed on Sep. 26, 2014, the contents of which are incorporated herein by reference.

TECHNICAL FIELD

The present invention relates to a dehumidifier, and in particular, relates to a dehumidifier that combines a moisture adsorption member and a heat pump.

BACKGROUND ART

Conventionally, dehumidifiers that combine adsorption-desorption action of the moisture adsorption member, and cooling and heating action of the heat pump have been known. For example, in Patent Literature 1, a dehumidifier having a configuration, in which a desiccant material (moisture adsorption member) in a rotor shape is disposed between a condenser and a evaporator of a heat pump so that airs of different relative humidity pass through the desiccant material, and thereby adsorption reaction and desorption reaction of moisture are repeated by rotating the desiccant material, is suggested. Moreover, the dehumidifier in Patent Literature 1 includes a heater for heating air to be dehumidified, and includes a configuration that raises evaporating temperature by supplying air heated by the heater to the evaporator, to thereby suppress frost formation on the evaporator.

CITATION LIST

Patent Literature

Patent Literature 1: Japanese Patent No. 4649967

SUMMARY OF INVENTION

Technical Problem

In the dehumidifier described in Patent Literature 1, an adsorption time and a desorption time by the desiccant material is determined based on a rotation speed of a rotor. Here, the time required by the desiccant material to become saturated and the time required to complete moisture desorption from the desiccant material differ depending on temperature and humidity of the air to be dehumidified, and other factors. Therefore, it is desirable to set the adsorption time and the desorption time corresponding to the air to be dehumidified.

Object of Invention

The present invention has been made to solve the above-described problem, and an object thereof is to provide a dehumidifier capable of setting the adsorption time and the desorption time corresponding to the air to be dehumidified and efficiently performing dehumidification operation.

Solution to Problem

A dehumidifier related to an embodiment of the present invention includes: a refrigerant circuit in which a compressor, a flow path switch that switches a refrigerant flow path, a first heat exchanger, a pressure-reducing device and a second heat exchanger are connected by piping; a moisture adsorption member that is arranged between the first heat exchanger and the second heat exchanger and performs adsorption of moisture contained in air flowing in an air path and desorption of the adsorbed moisture; a fan configured to blow air in a space to be dehumidified into the air path, the air-sending machine blowing the air in order of the first heat exchanger, the moisture adsorption member and the second heat exchanger; a controller configured to control the flow path switch; a storage unit configured to store an operation time map used to control the flow path switch; and a temperature and humidity detection unit configured to detect temperature and humidity in the space to be dehumidified, wherein the controller controls the flow path switch to switch a first operation mode, in which the first heat exchanger is caused to serve as an evaporator and the second heat exchanger is caused to serve as a condenser to adsorb moisture by the moisture adsorption member, and a second operation mode, in which the first heat exchanger is caused to serve as a condenser and the second heat exchanger is caused to serve as an evaporator to desorb moisture adsorbed by the moisture adsorption member, the operation time map associates temperature and humidity in the space to be dehumidified with a first time during which operation is performed in the first operation mode and a second time during which operation is performed in the second operation mode, and the controller acquires the first time and the second time corresponding to the temperature and the humidity detected by the temperature and the humidity detection unit from the operation tip, and controls the flow path switch in accordance with the first time and the second time that were acquired.

Advantageous Effects of Invention

According to a dehumidifier related to an embodiment of the present invention, a controller acquires an adsorption time and a desorption time corresponding to temperature and humidity based on an operation time map, and switching between adsorption and desorption can be performed at an optimum timing corresponding to air to be dehumidified. Thus, efficient dehumidification operation can be performed.

BRIEF DESCRIPTION OF DRAWINGS

FIG. 7 is a moist air graph showing transition of temperature and humidity in a second operation mode of the dehumidifier in Embodiment 1 of the present invention, where FIG. 7(a) shows a case in which no frost is formed, and FIG. 7(b) shows a case in which frost is formed.

DESCRIPTION OF EMBODIMENTS

Hereinafter, embodiments of the dehumidifier in the present invention will be described in detail based on the drawings.

Embodiment 1

Figure 1:
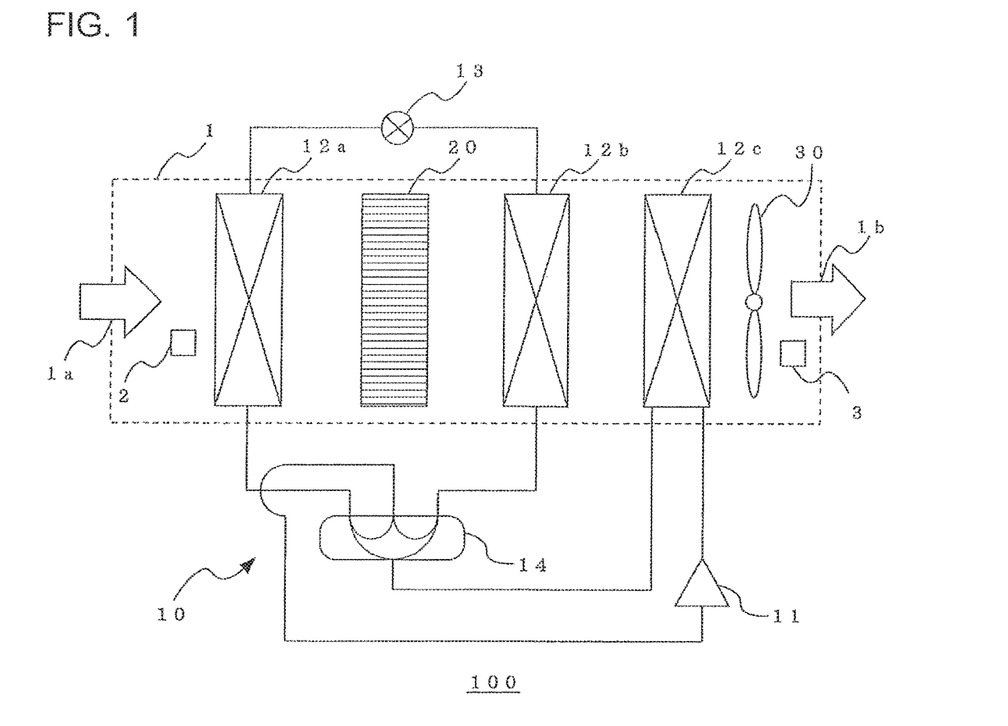
FIG. 1 is a schematic configuration diagram of a dehumidifier in Embodiment 1 of the present invention.

FIG. 1 is a schematic configuration diagram of a dehumidifier 100 in Embodiment 1 of the present invention. As shown in FIG. 1, the dehumidifier 100 includes a compressor 11, a first heat exchanger 12a, a second heat exchanger 12b, a third heat exchanger 12c, a refrigerant circuit 10 in which a pressure-reducing device 13 and a flow path switch 14 are connected by refrigerant pipes, a moisture adsorption member 20 and a fan 30, all of which are contained in a housing (not shown). Moreover, in the housing of the dehumidifier 100, an air path 1 that connects an air inlet 1a for taking in air from a space to be dehumidified and an air outlet 1b for releasing air to the space to be dehumidified is formed. In the air path 1, in order from the air inlet 1a side, the first heat exchanger 12a, the moisture adsorption member 20, the second heat exchanger 12b, the third heat exchanger 12c and the fan 30 are arranged.

The compressor 11 is a positive-displacement compressor that is driven by a not-shown motor and compresses the refrigerant in the refrigerant circuit 10. Note that, as the refrigerant in the embodiment, for example, HFC refrigerant, such as R410A, R4070 or R404A, HCFC refrigerant, such as R22 or R134a, natural refrigerant, such as carbon hydride or helium, or other refrigerant is used. Moreover, the number of compressor 11 is not limited to one, and two or more compressors 11 may be connected in parallel or in series.

The first heat exchanger 12a, the second heat exchanger 12b and the third heat exchanger 12c are fin-and-tube heat exchangers of a cross-fin type configured with a heat transfer pipe and multiple fins. The first heat exchanger 12a and the second heat exchanger 12b serve as a condenser (radiator) or an evaporator depending on the refrigerant circulation route switched by the flow path switch 14. The third heat exchanger 12c serves as a condenser (radiator). In the embodiment, due to provision of the third heat exchanger 12c serving as the condenser, the first heat exchanger 12a and the second heat exchanger 12b can be heat exchangers having the same configuration. This makes it possible to achieve commonality of parts.

The pressure-reducing device 13 reduces pressure of the refrigerant flowing through the refrigerant circuit 10 to adjust a flow rate. As the pressure-reducing device 13, an electronic expansion valve capable of adjusting an opening degree of expansion by a stepping motor (not shown), a mechanical expansion valve adopting a diaphragm for a pressure sensing part, or a capillary tube is used.

Figure 3:
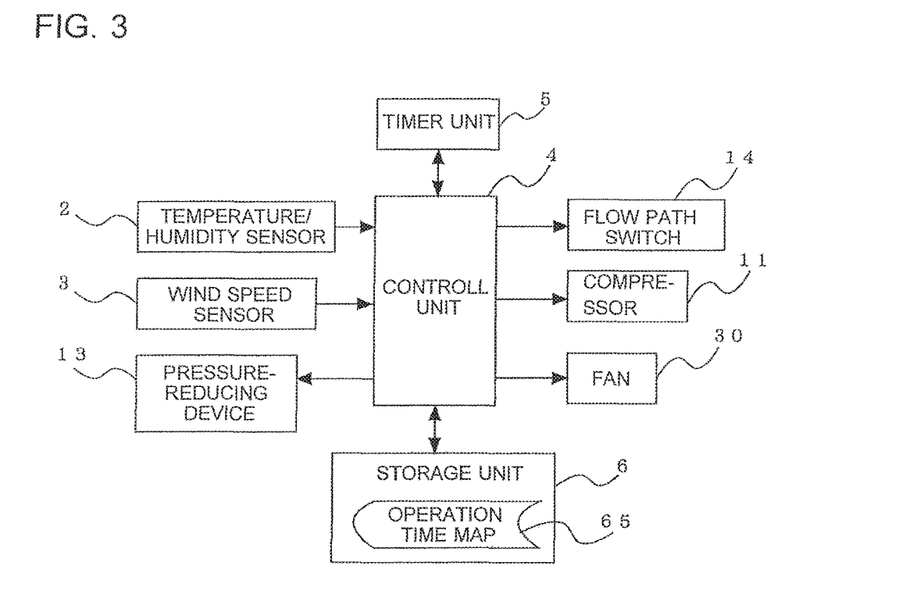
FIG. 3 is a block diagram showing a controller provided to the dehumidifier and components controlled by the controller in Embodiment 1 of the present invention.

The flow path switch 14 is a four-way valve for switching a direction of refrigerant flowing through the first heat exchanger 12a and the second heat exchanger 12b. The flow path switch 14 forms a flow path in which the refrigerant flows in the order of the third heat exchanger 12c, the second heat exchanger 12b, the pressure-reducing device 13 and the first heat exchanger 12a in the first operation mode. In the first operation mode, the third heat exchanger 12c and the second heat exchanger 12b serve as the condenser (radiator), and the first heat exchanger 12a serves as the evaporator. Moreover, the flow path switch 14 forms a flow path in which the refrigerant flows in the order of the third heat exchanger 12c, the first heat exchanger 12a, the pressure-reducing device 13 and the second heat exchanger 12b in the second operation mode. In the second operation mode, the third heat exchanger 12c and the first heat exchanger 12a serve as the condenser (radiator), and the second heat exchanger 12b serves as the evaporator. The switching of the flow path by the flow path switch 14 is controlled by the controller 4 (FIG. 3).

The moisture adsorption member 20 is a desiccant block settled between the first heat exchanger 12a and the second heat exchanger 12b. The moisture adsorption member 20 is configured with a porous flat plate in a shape corresponding to the cross section of the air path 1 of the dehumidifier 100 (a polygonal shape or a circular shape) for obtaining a large ventilating cross-sectional area with respect to the cross-sectional area of the air path 1. Then, the air passes through the moisture adsorption member 20 in the thickness direction thereof. Moreover, coating, surface processing or impregnation is applied to the surface of the porous flat plate with an adsorbent having characteristics of moisture adsorption from air of relatively high humidity and moisture desorption to air of relatively low humidity. As the adsorbent, zeolite, silica gel, active carbon, polymer adsorbent, or other materials are used.

Figure 2:
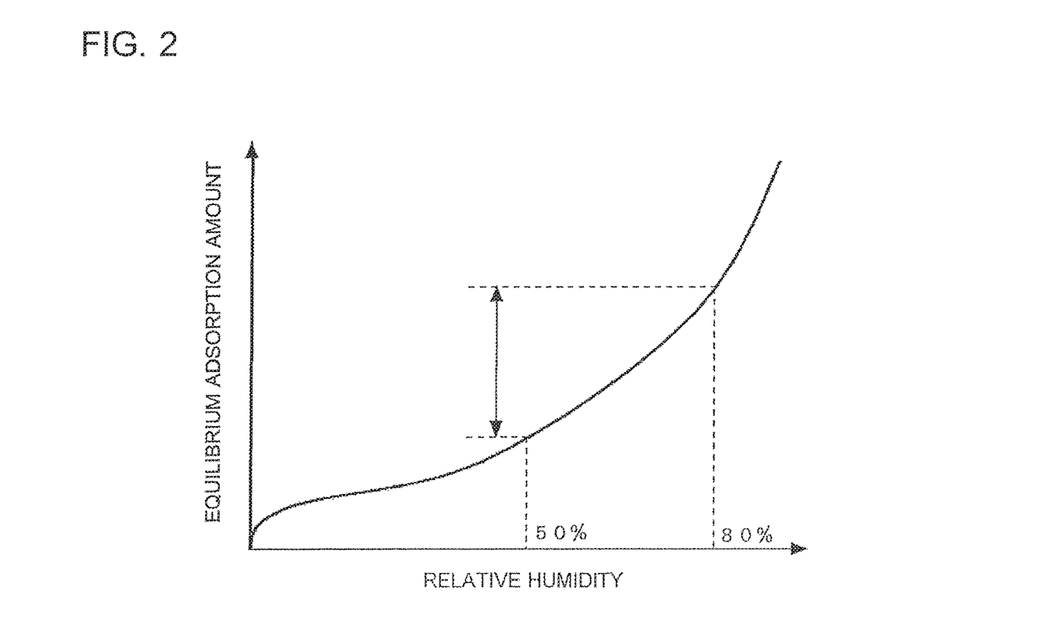
FIG. 2 is an adsorption isothermal graph showing transition of an equilibrium adsorption amount of a moisture adsorption member with respect to relative humidity in Embodiment 1 of the present invention.

FIG. 2 is an adsorption isothermal graph showing transition of an equilibrium adsorption amount of the moisture adsorption member 20 with respect to relative humidity in this embodiment. In general, the equilibrium adsorption amount is increased with the increase of relative humidity. In this embodiment, an adsorbent with a large difference between the equilibrium adsorption amount in the relative humidity of 80% or more and the equilibrium adsorption amount in the relative humidity of 40% to 60% (for example, 50%) is used. This makes it possible to improve adsorption and desorption capability of the moisture adsorption member 20.

The fan 30 is capable of changing a flow rate of air passing through the air path 1 of the dehumidifier 100. As the fan 30, a centrifugal fan or a multi-blade fan driven by a motor, such as a DC fan motor, is used. Note that, a disposition of the fan 30 is not limited to disposition thereof at the most downstream side of the air path 1 The fan 30 may be disposed at a given position capable of sending air of a target air volume in the order of the first heat exchanger 12a, the moisture adsorption member 20, the second heat exchanger 12b and the third heat exchanger 12c.

The dehumidifier 100 further includes a temperature/humidity sensor 2 configured to detect the temperature and the humidity of the air to be dehumidified taken from the air inlet 1a and a wind speed sensor 3 configured to detect speed of air (wind speed) passing through the inside of the air path 1. Note that a disposition of the wind speed sensor 3 is not limited to that in FIG. 1 (the most downstream side of the air path 1); the wind speed sensor 3 may be disposed at a given position capable of detecting the wind speed of air passing through the air path 1.

Moreover, the dehumidifier 100 includes a controller 4, a timer unit 5 and a storage unit 6. FIG. 3 is a block diagram showing the controller 4 provided to the dehumidifier 100 and components controlled by the controller 4 in the embodiment. The controller 4 is configured with a microcomputer or other components, and controls the entirety of the dehumidifier 100. The controller 4 performs various kinds of controls, such as rotation speed control of the fan 30, rotation speed control of the compressor 11, opening degree control of the pressure-reducing device 13 and switching control of the flow path switch 14, based on the outputs from the temperature/humidity sensor 2, wind speed sensor 3 and the timer unit 5. The timer unit 5 measures the operating time of the dehumidifier 100 under the control of the controller 4. The storage unit 6 is a memory configured to store programs required to operate the dehumidifier 100 and various kinds of data items. In the storage unit 6, an operation time map 65 to be described later is stored.

Figure 4:
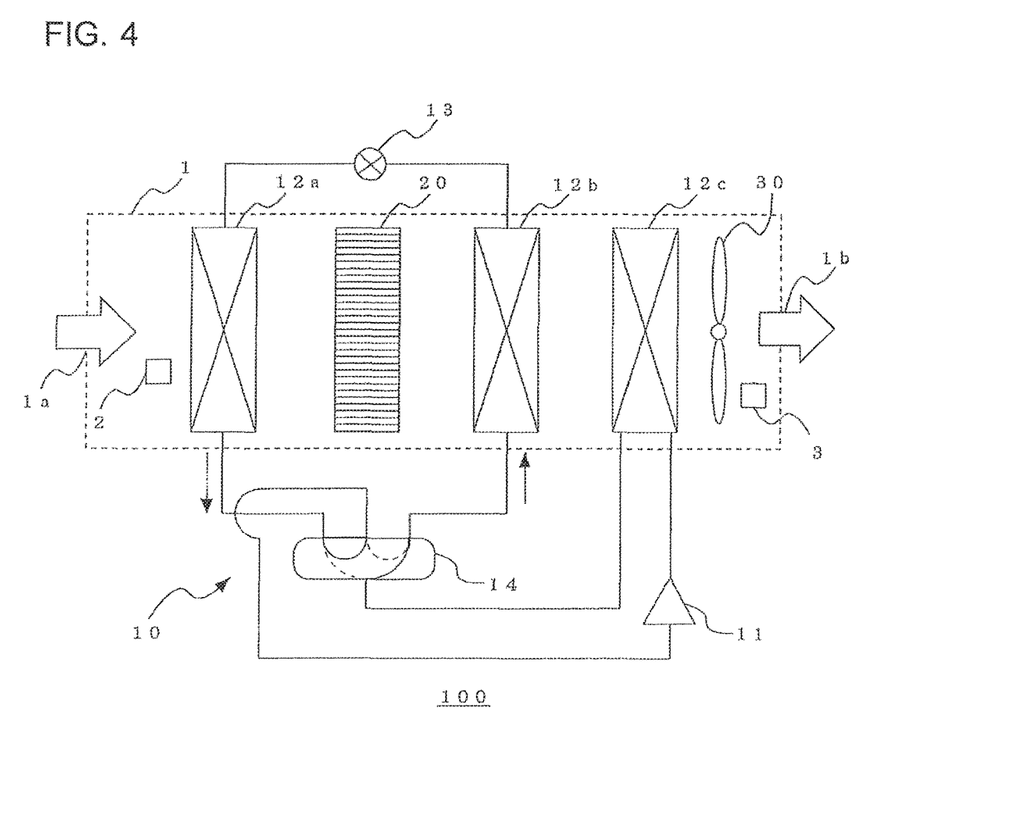
FIG. 4 is a diagram showing a refrigerant circulation route in a first operation mode of the dehumidifier in Embodiment 1 of the present invention.
Figure 5:
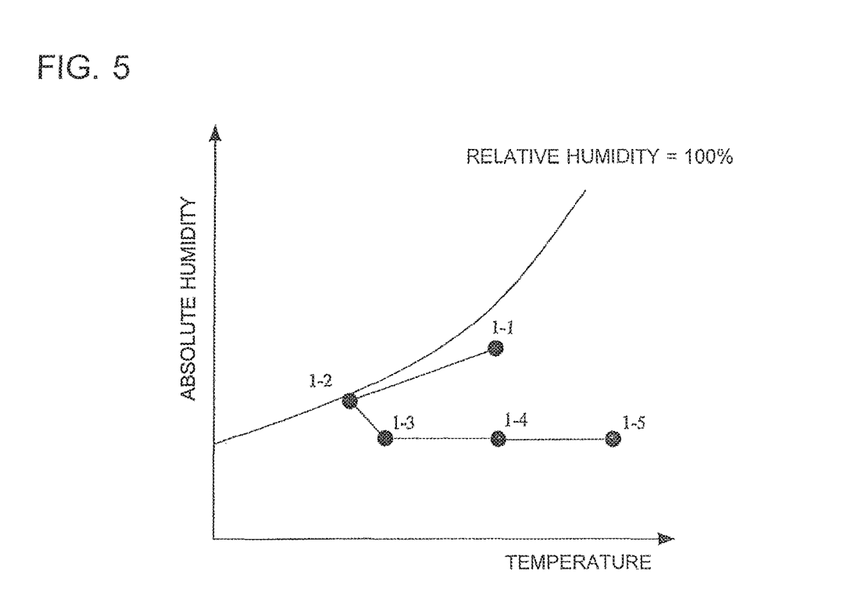
FIG. 5 is a moist air graph showing transition of temperature and humidity in a first operation mode of the dehumidifier in Embodiment 1 of the present invention.
Figure 6:
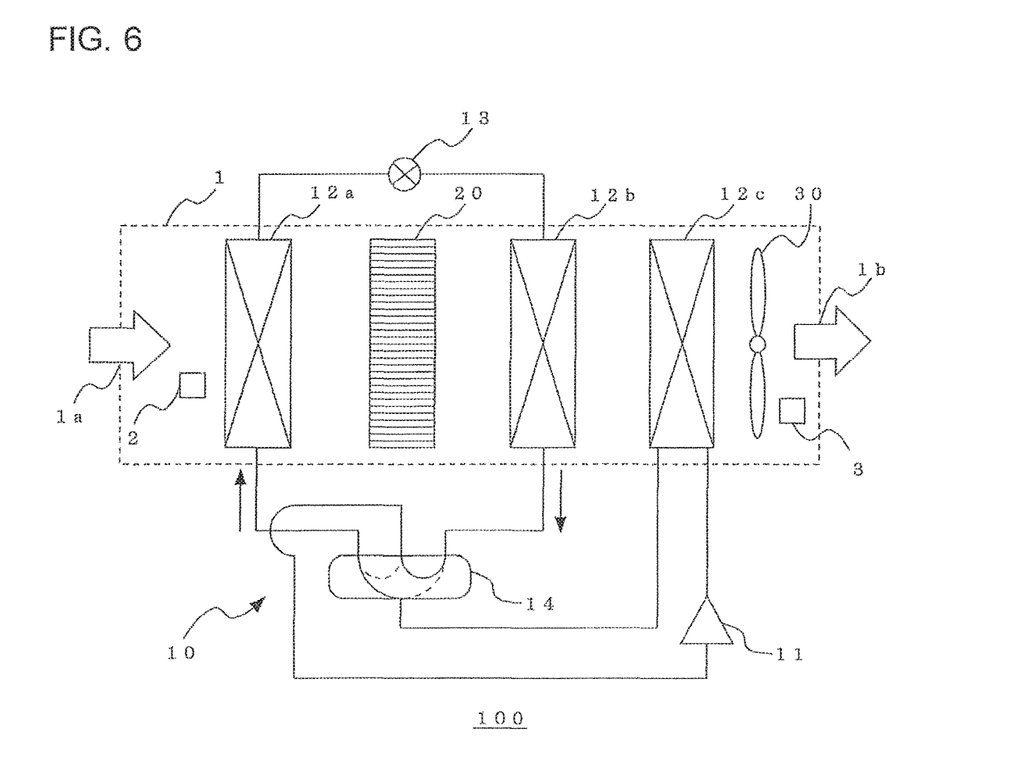
FIG. 6 is a diagram showing the refrigerant circulation route in a second operation mode of the dehumidifier in Embodiment 1 of the present invention.
Figure 7:
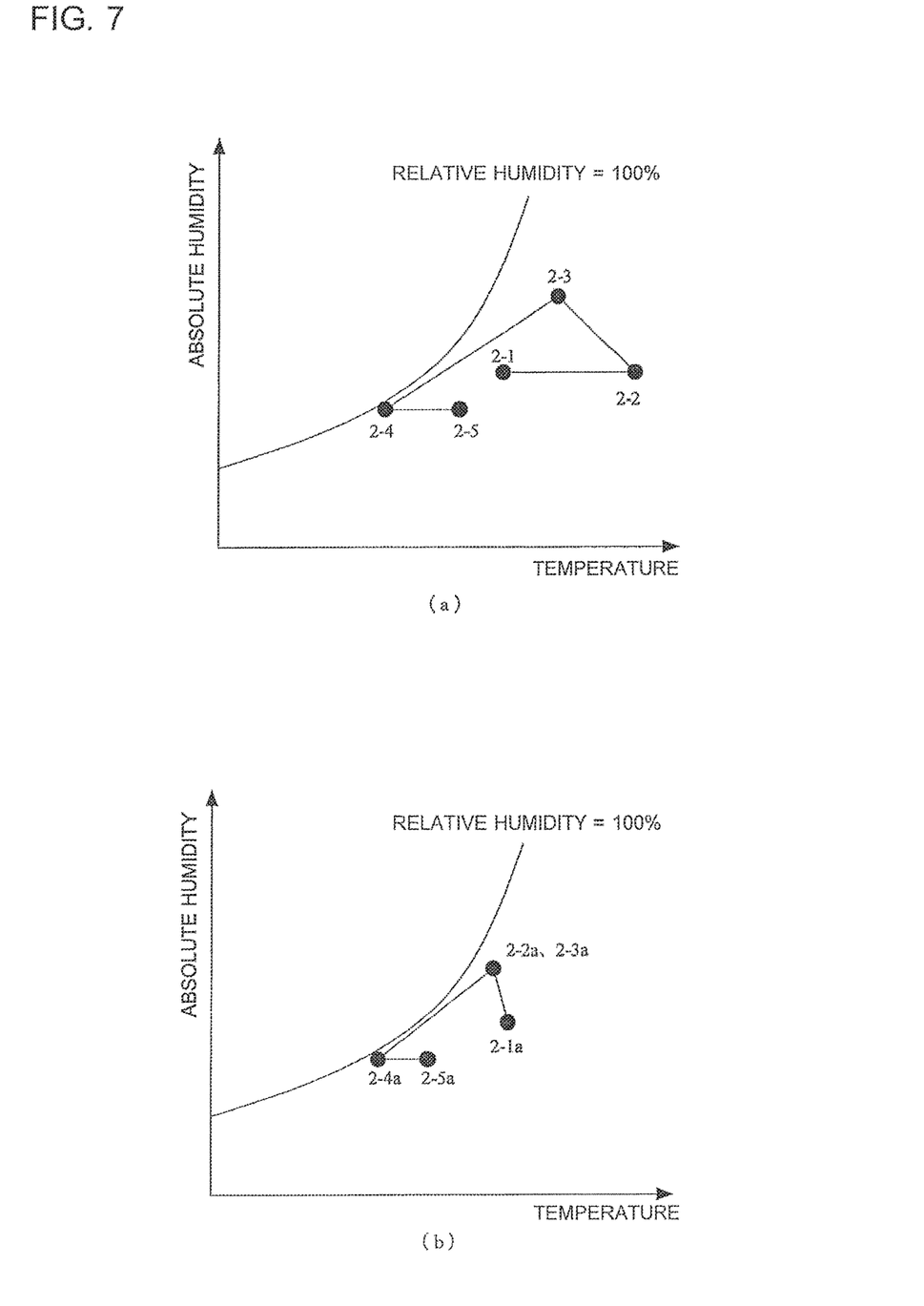

Next, operation modes of the dehumidifier 100 will be described. The dehumidifier 100 operates in the first operation mode and the second operation mode by the control of the flow path switch 14 by the controller 4 to switch the refrigerant circulation route of the refrigerant circuit 10. In the first operation mode, the moisture adsorption member 20 performs adsorption operation with respect to air of low water retention amount and high humidity (for example, relative humidity of 70% or more), and in the second operation mode, the moisture adsorption member 20 performs desorption operation with respect to air of high water retention amount and low humidity (for example, relative humidity of 60% or less). FIG. 4 shows the refrigerant circulation route in the first operation mode, and FIG. 5 is a moist air graph showing transition of humidity in the first operation mode. Moreover, FIG. 6 shows the refrigerant circulation route in the second operation mode, and FIG. 7 is the moist air graph showing transition of temperature and humidity in the second operation mode.

(First Operation Mode: Operation of Refrigerant Circuit 10)

First, refrigerant operation of the refrigerant circuit 10 in the first operation mode will be described with reference to FIG. 4. In the first operation mode, the refrigerant flows along the solid line shown in FIG. 4. More in detail, the refrigerant compressed by the compressor 11 and discharged flows into the third heat exchanger 12*c*. The third heat exchanger 12*c* serves as a condenser, and the refrigerant exchanges heat with air and is partially condensed and liquefied. The refrigerant passed through the third heat exchanger 12*c* passes through the flow path switch 14 and flows into the second heat exchanger 12*b*. The second heat exchanger 12*b* serves as a condenser, and the refrigerant exchanges heat with air and is condensed and liquefied. The refrigerant passed through the second heat exchanger 12*b* flows into the pressure-reducing device 13, and after the pressure thereof is reduced by the pressure-reducing device 13, the refrigerant flows into the first heat exchanger 12*a*, The first heat exchanger 12*a* serves as an evaporator, and the refrigerant exchanges heat with air and is evaporated. The refrigerant passed through the first heat exchanger 12*a* passes through the flow path switch 14 and is sucked into the compressor 11 again.

(First Operation Mode: Movement of Air)

Next, movement of air in the air path 1 of the dehumidifier 100 in the first operation mode will be described with reference to FIG. 5. In the first operation mode, first, the air to be dehumidified is introduced from the air inlet 1*a* of the dehumidifier 100 (FIG. 5, point 1-1) and flows into the first heat exchanger 12*a*. Here, the air to be dehumidified is cooled down to a dew-point temperature or less by the first heat exchanger 12*a* serving as an evaporator, to thereby become dehumidified air, from which the moisture has been removed (FIG. 5, point 1-2). The air cooled and dehumidified by the first heat exchanger 12*a* flows into the moisture adsorption member 20. Here, since the relative humidity of the air cooled and humidified becomes as high as around 80% RH to 90% RH, the adsorbent of the moisture adsorption member 20 is more likely to adsorb the moisture, The air from which the moisture is adsorbed (dehumidified) by the adsorbent of the moisture adsorption member 20 to be of low humidity (FIG. 5, point 1-3) flows into the second heat exchanger 12*b*. Since the second heat exchanger 12*b* serves as a condenser, the air passing through is heated, and a temperature thereof is increased (FIG. 5, point 1-4). The air passed through the second heat exchanger 12*b* flows into the third heat exchanger 12*c*. Since the third heat exchanger 12*c* serves as a condenser, the air passing through is heated, and a temperature thereof is increased (FIG. 5, point 1-5), The air passed through the third heat exchanger 12*c* is released from the air outlet 1*b*.

(Second Operation Mode: Operation of Refrigerant Circuit 10)

Next, refrigerant operation of the refrigerant circuit 10 in the second operation mode will be described with reference to FIG. 6. In the second operation mode, the refrigerant flows along the solid line shown in FIG. 6. More in detail, the refrigerant compressed by the compressor 11 and discharged flows into the third heat exchanger 12*c*. The third heat exchanger 12*c* serves as a condenser, and the refrigerant exchanges heat with air and is partially condensed and liquefied. The refrigerant passed through the third heat exchanger 12*c* passes through the flow path switch 14 and flows into the first heat exchanger 12*a*. The first heat exchanger 12*a* serves as a condenser, and the refrigerant exchanges heat with air and is condensed and liquefied. The refrigerant passed through the first heat exchanger 12*a* flows into the pressure-reducing device 13, and after the pressure thereof is reduced by the pressure-reducing device 13, the refrigerant flows into the second heat exchanger 12*b*. The second heat exchanger 12*b* serves as an evaporator, and the refrigerant exchanges heat with air and is evaporated. The refrigerant passed through the second heat exchanger 12*b* passes through the flow path switch 14 and is sucked into the compressor 11 again.

(Second Operation Mode: Movement of Air)

Next, movement of air in the air path 1 of the dehumidifier 100 in the second operation mode will be described with reference to FIG. 7. Note that, in the second operation mode, the movement of air differs depending on whether or not the frost is formed on the first heat exchanger 12*a* or the second heat exchanger 12*b*. Therefore, the moist air graph in the case where no frost is formed is shown in FIG. 7(*a*), and the moist air graph in the case where the frost is formed is shown in FIG. 7(*b*). Note that, in the example of FIG. 7(*b*), a description will be given of a case in which the frost is formed on the first heat exchanger 12*a*.

First, the case in which no frost is formed will be described with reference to FIG. 7(*a*). The air to be dehumidified is introduced from the air inlet 1*a* of the dehumidifier 100 (FIG. 7(*a*), point 2-1) and flows into the first heat exchanger 12*a*. Here, the air to be dehumidified is heated by the first heat exchanger 12*a* serving as a condenser, and the temperature thereof is increased (FIG. 7(*a*), point 2-2). The air passed through the first heat exchanger 12*a* flows into the moisture adsorption member 20. Here, since the relative humidity of the air heated by the first heat exchanger 12*a* becomes lower than the relative humidity of the air when being introduced, the adsorbent of the moisture adsorption member 20 is more likely to desorb the moisture. The air from which the moisture is desorbed (humidified) by the adsorbent of the moisture adsorption member 20 to be of low temperature and high humidity (FIG. 7(a), point 2-3) flows into the second heat exchanger 12b. Since the second heat exchanger 12b serves as an evaporator, the air passing through the second heat exchanger 12b is cooled down to a dew-point temperature or less, to thereby become dehumidified air, from which the moisture has been removed (FIG. 7(a), point 2-4). The air cooled and dehumidified by the second heat exchanger 12b flows into the third heat exchanger 12c. Since the third heat exchanger 12c serves as a condenser, the air passing through is heated, and a temperature thereof is increased (FIG. 7(a), point 2-5). The air passed through the third heat exchanger 12c is released from the air outlet 1b.

Next, the case in which the frost is formed will be described with reference to FIG. 7(b). The air to be dehumidified is introduced from the air inlet 1a of the dehumidifier 100 (FIG. 7(b), point 2-1a) and flows into the first heat exchanger 12a. The first heat exchanger 12a has the frost formed thereon, and defrosting is performed by the first heat exchanger 12a serving as a condenser in the second operation mode. The relative humidity of the air passing through the first heat exchanger 12a is increased by defrosting (FIG. 7(b), point 2-2a), and the air flows into the moisture adsorption member 20. The temperature of the air at this time varies depending on the temperature and the humidity of the introduced air and the state of defrosting. Since the relative humidity of the air flowed into the moisture adsorption member 20 is increased by defrosting, the adsorbent of the moisture adsorption member 20 is less likely to desorb the moisture, as compared to the case in which no frost is formed. Therefore, the air passing through the moisture adsorption member 20 flows into the second heat exchanger 12b with hardly any humidification (FIG. 7(b), point 2-3a). Note that the adsorption-desorption reaction changes with the time course of defrosting. Since the second heat exchanger 12b serves as an evaporator, the air passing through the second heat exchanger 12b is cooled down to a dew-point temperature or less, to thereby become dehumidified air, from which the moisture has been removed (FIG. 7(b), point 2-4a). The air cooled and dehumidified by the second heat exchanger 12b flows into the third heat exchanger 12c. Since the third heat exchanger 12c serves as a condenser, the air passing through is heated, and a temperature thereof is increased (FIG. 7(b), point 2-5a). The air passed through the third heat exchanger 12c is released from the air outlet 1b.

As described above, in this embodiment, when the frost is formed on the first heat exchanger 12a or the second heat exchanger 12b, defrosting can be performed by use of condensing heat due to switching the refrigerant flow path (operation mode) by the flow path switch 14. This makes it unnecessary to have a heater for defrosting or to suspend the compressor 11 for defrosting, and accordingly, it becomes possible to reduce power consumption and defrosting time. Moreover, in the second operation mode, dehumidification by the moisture adsorption member 20 is not performed, but only dehumidification by the second heat exchanger 12b is performed. Therefore, in this embodiment, provision of the third heat exchanger 12c results in the configuration in which the condensing heat in the first heat exchanger 12a is suppressed. This makes it possible to reduce moisture amount cannot be captured in the second heat exchanger 12b.

Figure 8:
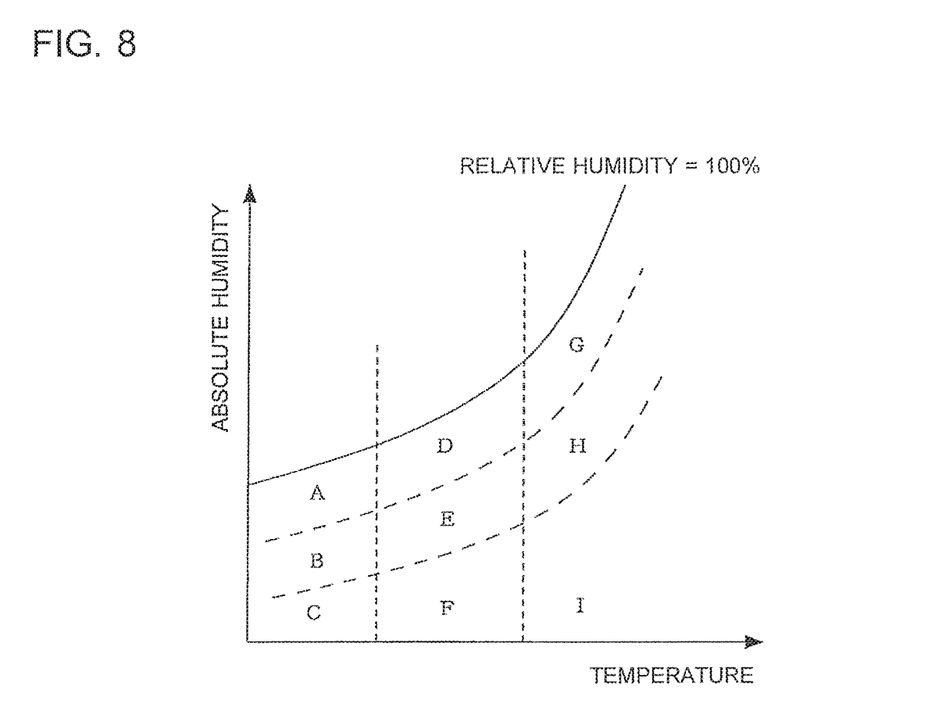
FIG. 8 is a graph illustrating an operation time map of the dehumidifier in Embodiment 1 of the present invention.

Next, switching between the respective operation modes will be described. The dehumidifier 100 of this embodiment performs dehumidification of space to be dehumidified while alternately switching the first operation mode and the second operation mode described above. Moreover, the timing of switching between the first operation mode and the second operation mode is determined based on the operation time map 65 stored in the storage unit 6. FIG. 8 is a graph illustrating the operation time map 65. In the operation time map 65, the time of operating in the first operation mode (hereinafter, referred to as "adsorption time") and the time of operating in the second operation mode (hereinafter, referred to as "desorption time") are mapped in advance per each temperature and humidity of the air to be dehumidified. In the example of FIG. 8, the temperature and the humidity of the air to be dehumidified is divided into nine regions of A to I, and the adsorption time and the desorption time are set for each of the regions A to I. Note that the dehumidification amount in the first operation mode is the sum of the condensation amount in the first heat exchanger 12a and the moisture adsorption amount in the moisture adsorption member 20; conversely, the dehumidification amount in the second operation mode is only the condensation amount in the second heat exchanger 12b, and accordingly, in general, the dehumidification amount becomes large in the first operation mode. Therefore, the adsorption time is set to be longer than the desorption time.

Setting of the adsorption time and the desorption time in the operation time map 65 will be described in detail. In the setting of the operation time map 65, first, by using the temperature and the humidity in the region E of FIG. 8 as a reference, optimum adsorption time and desorption time in the region E are acquired in advance by experiments or other methods, and are set as reference times (for example, the adsorption time of 60 minutes and the desorption time of 15 minutes). Then, values increased and decreased from the reference time depending on magnitude of the temperature and the humidity with respect to the reference are set as the adsorption time and the desorption time corresponding to each temperature and humidity region. Here, in the dehumidifier 100, by performing switching from adsorption (the first operation mode) to desorption (the second operation mode) before the moisture adsorption member 20 becomes saturated and immediately before the adsorption speed is reduced, the ability of the moisture adsorption member 20 can be maximized. Then, the time when the moisture adsorption member 20 becomes saturated is determined by the temperature and the humidity in a dehumidified space. For example, when the relative humidity in the dehumidified space is high and a large moisture content exists in the air, there is a large moisture content that reaches the moisture adsorption member 20, and the time to become saturated is reduced. On the other hand, when the relative humidity in the dehumidified space is low and a small moisture content exists in the air, there is a small moisture content that reaches the moisture adsorption member 20, and the time to become saturated is increased. Consequently, the setting is made such that the adsorption time is shorter in the case of high relative humidity in the dehumidified space, and the adsorption time is longer in the case of low relative humidity in the dehumidified space. Specifically, in FIG. 8, for the region D with higher humidity than the region E, the adsorption time that is shorter than the region E is set. On the other hand, for the region F with lower humidity than the region E, the adsorption time that is longer than the region E is set.

Moreover, by increase of the temperature in the dehumidified space, movement of water molecules in the air becomes active, and accordingly, the time until the moisture adsorption member 20 becomes saturated is reduced. Therefore, the setting is made such that the adsorption time is shorter in the case of high temperature, and the adsorption time is longer in the case of low temperature. Specifically, in FIG. 8, for the region H with higher temperature than the region E, the adsorption time that is shorter than the region E is set. On the other hand, for the region B with lower temperature than the region E, the adsorption time that is longer than the region E is set.

On the other hand, the time required for desorption from the moisture adsorption member 20 also varies depending on the temperature and the humidity in the dehumidified space. After the desorption from the moisture adsorption member 20 is completed, the condensation amount in the second heat exchanger 12*b* becomes small as compared to the condensation amount before desorption. Consequently, in the second operation mode, efficiency is increased by performing switching to the first operation mode at the same time as the desorption in the moisture adsorption member 20 is completed. Desorption requires time until completion when the relative humidity in the dehumidified space is high and the moisture content in the air is large, and desorption is completed earlier when the relative humidity in the dehumidified space is low and the moisture content in the air is small. Therefore, the setting is made such that the desorption time is longer in the case of high relative humidity in the dehumidified space, and the desorption time is shorter in the case of low relative humidity in the dehumidified space. Specifically, in FIG. 8, for the region D with higher humidity than the region E, the desorption time that is longer than the region E is set. Moreover, for the region F with lower humidity than the region E, the desorption time that is shorter than the region E is set.

Moreover; by increase of the temperature in the dehumidified space, movement of water molecules adsorbed by the moisture adsorption member 20 becomes active, and accordingly, the desorption speed in the moisture adsorption member 20 is increased. Therefore, the setting is made such that the desorption time is shorter in the case of high temperature, and the desorption time is longer in the case of low temperature. Specifically, in FIG. 8, for the region H with higher temperature than the region E, the desorption time that is shorter than the region E is set. On the other hand, for the region B with lower temperature than the region E, the desorption time that is longer than the region E is set.

Figure 9:
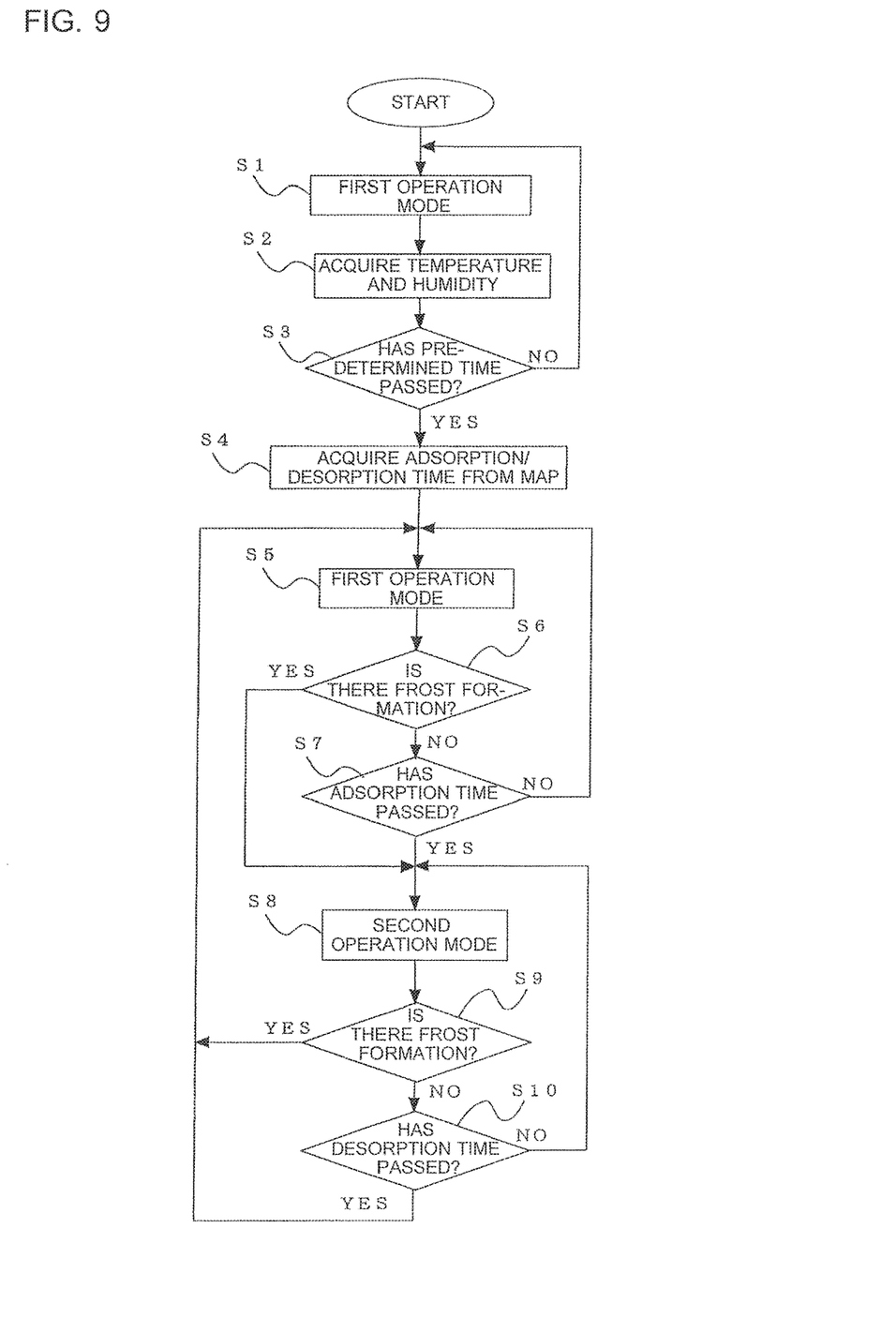
FIG. 9 is a flowchart showing a switching process of the operation mode in Embodiment 1 of the present invention.

FIG. 9 is a flowchart showing a switching process of the operation mode using the operation time map 65. This process is executed by the controller 4 when operation of the dehumidifier 100 is started. In the process, first, the flow path switch 14 is controlled to operate in the first operation mode (S1). Then, during operation in the first operation mode, the temperature and the humidity of the dehumidified space are acquired by the temperature/humidity sensor 2 (S2), and it is determined whether or not a predetermined time has passed (S3). The passage of predetermined time is determined based on the time measured by the timer unit 5. When the predetermined time has not passed yet (S3: NO), operation in the first operation mode is continued until the predetermined time has passed, and the temperature and the humidity are acquired by the temperature/humidity sensor 2. On the other hand, when the predetermined time has passed (S3: YES), the adsorption time and the desorption time according to an average value of the temperature and the humidity acquired within the predetermined time are acquired from the operation time map 65 stored in the storage unit 6 (S4).

The temperature and humidity of the dehumidified space vary depending on opening and closing of a door in the dehumidified space in many cases. Moreover, if the door is not opened or closed, the temperature and the humidity of the air discharged from the dehumidifier 100 in the first operation mode and the second operation mode are varied, and thereby the temperature and the humidity of the entire dehumidified space are also varied. Here, as compared to the second operation mode, operation in the same mode is longer in the first operation mode, and accordingly, the temperature and the humidity in the dehumidified space become stable. Therefore, by obtaining the adsorption time and the desorption time from the operation time map 65 by use of the average value of the temperature and the humidity acquired in the predetermined time in the first operation mode, influence caused by the variations is suppressed, and accordingly, the optimum adsorption time and desorption time can be acquired. Note that, in a different embodiment, not the average value of the temperature and the humidity in the predetermined time, but the temperature and the humidity when the operation is started may be used.

Next, operation in the first operation mode is performed (S5). Then, it is determined whether or not the frost is formed on the first heat exchanger 12*a* (S6). When the frost is formed on the first heat exchanger 12*a* or the second heat exchanger 12*b*, blockage in the air path 1 is caused by the frost formation, and air volume is reduced, to thereby result in insufficient dehumidification ability in some cases. Therefore, if there is any frost formation, it is desirable to perform switching of the operation mode regardless of the adsorption time acquired from the operation time map 65. Here, when the wind speed detected by the wind speed sensor 3 is determined to be reduced to the reference value or less, it is determined that the frost is formed on the first heat exchanger 12*a*.

When there is no frost formation on the first heat exchanger 12*a* (S6: NO), it is determined whether or not the adsorption time obtained in S4 has passed (S7). The passage of the adsorption time is determined based on the time measured by the timer unit 5. When the adsorption time has not passed yet (S7: NO), the process returns to S5 and the operation in the first operation mode is continued. On the other hand, when it is determined that there is frost formation on the first heat exchanger 12*a* (S6: YES), or the adsorption time has already passed (S7: YES), the flow path switch 14 is controlled to perform switching to the second operation mode (S8).

Then, it is determined whether or not the frost is formed on the second heat exchanger 12*b* (S9). Here, when the wind speed detected by the wind speed sensor 3 is reduced to the reference value or less, it is determined that the frost is formed on the second heat exchanger 12*b*. When there is no frost formation on the second heat exchanger 12*b* (S9: NO), it is determined whether or not the desorption time acquired in S4 has passed (S10). The passage of the desorption time is determined based on the time measured by the timer unit 5. When the desorption time has not passed yet (S10: NO), the process returns to S8 and the operation in the second operation mode is continued. On the other hand, when it is determined that there is frost formation on the second heat exchanger 12*b* (S9: YES), or the desorption time has already passed (S10: YES), the flow path switch 14 is controlled to perform switching to the first operation mode (S5).

As described above, in this embodiment, when the high-performance dehumidifier 100 combining the moisture adsorption member 20 and a heat pump (refrigerant circuit 10) is configured, it is possible to reduce pressure loss in blowing air, as compared to a conventional art provided with a rotor-shaped moisture adsorption member, by forming the air path 1 linearly. This makes it possible to reduce power consumption in the fan 30 configured to blow air, to thereby provide a device of higher efficiency. Moreover, in the embodiment, the moisture adsorption member 20 is settled between the first heat exchanger 12a and the second heat exchanger 12b, and adsorption and desorption are performed by switching the operation mode by the flow path switch 14; accordingly, a member for rotationally driving the moisture adsorption member 20 is unnecessary, and downsizing of the device and cost-cutting can be achieved.

Further, by obtaining the adsorption time and the desorption time corresponding to the relative humidity and temperature of the dehumidified space from the operation time map 65, it is possible to switch between the first operation mode and the second operation mode at more appropriate timing in accordance with the air to be dehumidified. This makes it possible to operate the dehumidifier 100 efficiently.

Embodiment 2

Next, the dehumidifier 100 in Embodiment 2 of the present invention will be described. The dehumidifier 100 in Embodiment 2 is different from that of Embodiment 1 in that the operation time map 65 is changed prior to the operation mode switching process. Other than this, the configuration of the dehumidifier 100 and the operation mode switching process are the same as those in Embodiment 1.

In some locations where the dehumidifier 100 is placed, sometimes, the wind speed is changed due to circumstances of the locations. For example, when a rated voltage of the dehumidifier 100 is 200V, the operation time map 65 is created based on the assumption of the wind speed at 200V. However, depending on locations where the dehumidifier 100 is placed, the voltage varies from about 180V to about 220V. Then, in the case of 220V, the wind speed and the air volume are larger than those at 200V. Moreover, in some locations, a duct is connected to at least one of the air inlet 1a and the air outlet 1b of the dehumidifier 100. In this case, the air volume passing through the air path 1 is reduced. Therefore, in this embodiment, a configuration capable of changing the operation time map 65 in accordance with locations where the dehumidifier 100 is placed is employed.

Figure 10:
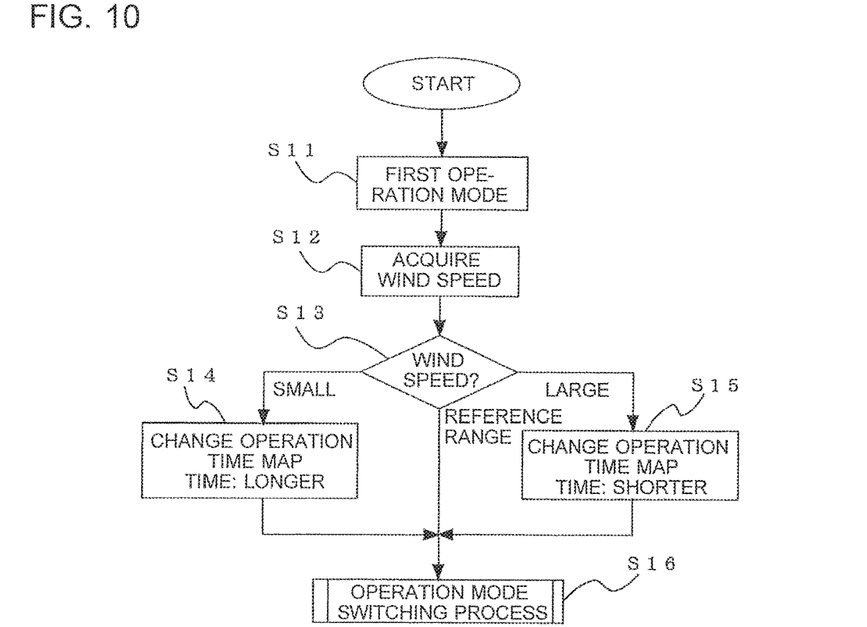
FIG. 10 is a flowchart showing an operation time map changing process in Embodiment 2 of the present invention.

FIG. 10 is a flowchart showing a map changing process in this embodiment. This process is executed by the controller 4 prior to the operation mode switching process in FIG. 9. In the process, the operation time map 65 is changed depending on the wind speed detected by the wind speed sensor 3. First, the flow path switch 14 is controlled to operate in the first operation mode (S11). Then, the wind speed is acquired by the wind speed sensor 3 (S12), and comparison of the acquired wind speed with a reference range is conducted (S13). The reference range in this case means a range providing a predetermined width to the wind speed assumed in creating the operation time map 65.

Then, when the wind speed acquired in S12 is smaller than the reference range (S13: SMALL), the operation time map 65 is changed (S14). Here, when the wind speed (air volume) passing through the moisture adsorption member 20 is small, the saturation time and the desorption time are increased. Therefore, when the wind speed is smaller than the reference range, both of the adsorption time and the desorption time set in the operation time map 65 are changed longer. Then, by the changed operation time map 65, the operation mode switching process in FIG. 9 is executed (S16).

On the other hand, when the wind speed acquired in S12 is larger than the reference range (S13: LARGE), the operation time map 65 is changed (S15). Here, when the wind speed (air volume) passing through the moisture adsorption member 20 is large, the saturation time and the desorption time are reduced. Therefore, when the wind speed is larger than the reference range, both of the adsorption time and the desorption time set in the operation time map 65 are changed shorter. Then, by the changed operation time map 65, the operation mode switching process in FIG. 9 is executed (S16).

Moreover, when the wind speed acquired in S12 falls within the reference range (S13: REFERENCE RANGE), the operation mode switching process of FIG. 9 is executed without changing the operation time map 65 (S16).

In this manner, in the dehumidifier 100 of the embodiment, it is possible to set the adsorption time and the desorption time depending on the actual operation status by changing the operation time map 65 in accordance with the circumstances of the locations. This makes it possible to operate the dehumidifier 100 efficiently regardless of the circumstances of the locations.

Embodiment 3

Figure 11:
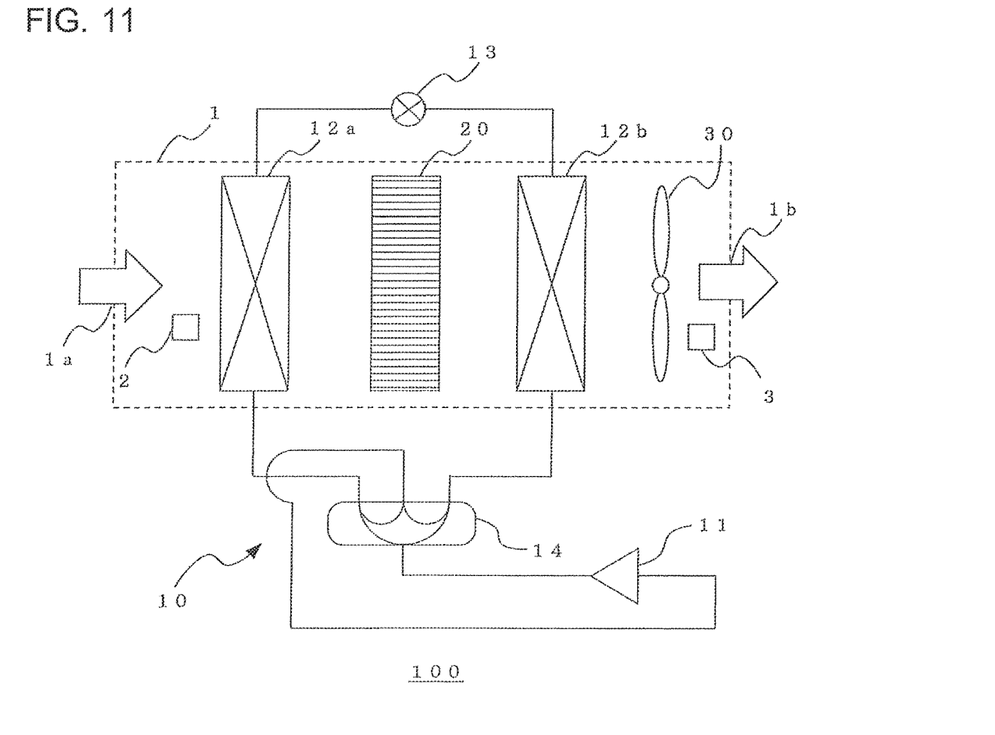
FIG. 11 is a schematic configuration diagram of a dehumidifier in Embodiment 3 of the present invention.

Next, the dehumidifier 100 in Embodiment 3 of the present invention will be described. FIG. 11 is a schematic configuration diagram of the dehumidifier 100 in Embodiment 3. The dehumidifier 100 in this embodiment is different from that of Embodiment 1 in that the third heat exchanger 12c is not provided. Other than this, the configuration of the dehumidifier 100 and the operation mode switching process are the same as those in Embodiment 1, In the embodiment, the refrigerant flows into the flow path switch 14 from the compressor 11, and thereafter, similar to Embodiment 1, the refrigerant flows through the refrigerant circulation route corresponding to the operation mode. Also in this embodiment, similar to Embodiment 1, the first operation mode and the second operation mode are switched at an appropriate timing in accordance with the air to be dehumidified, and thereby; it becomes possible to operate the dehumidifier 100 efficiently.

The embodiments of the present invention have been described above; however, the present invention is not limited to the configurations of the above-described embodiments, and various modifications or combinations within the scope of the technical idea of the present invention are available. For example, in the dehumidifier 100 of the above embodiments, the configuration to perform the operation mode switching process based on the single operation time map 65 is employed; however, a configuration including multiple different operation time maps 65 may be provided to each model of the dehumidifier 100. In the dehumidifier 100, both of the dehumidification by the heat exchanger (the first heat exchanger 12a or the second heat exchanger 12b) serving as the evaporator of the refrigerant circuit 10 and the dehumidification by the moisture adsorption member 20 are performed. Here, in some models of the dehumidifier 100, a contribution ratio of the dehumidification amount by the moisture adsorption member 20 to the entire dehumidification amount is different. In the models providing the dehumidification amount by the moisture adsorption member 20 that is larger than that of the standard model, the adsorption time and the desorption time may be set longer in advance, because the large moisture adsorption amount can be secured. On the other hand, in the models providing the dehumidification amount by the moisture adsorption member 20 that is smaller than that of the standard model, the adsorption time and the desorption time may be set shorter in advance, because the small moisture adsorption amount is secured. In this manner, it becomes possible to perform dehumidification operation furthermore efficiently by providing the operation time map 65 for each model, and selecting the operation time map 65 in accordance with the model to use thereof.

Moreover, in the above embodiments, a description was given of the configuration to switch the first operation mode and the second operation mode; however, the present invention is not limited thereto. In general, when the temperature and the humidity of air are high, dehumidification by the refrigerant circuit 10 is dominant, and when the temperature and the humidity of air are low, dehumidification by the moisture adsorption member 20 is dominant. Therefore, when the temperature and the humidity detected by the temperature/humidity sensor 2 are high temperature and high humidity, the configuration may be such that the first operation mode is continued. Specifically, when the temperature and the humidity detected by the temperature/humidity sensor 2 fall within the region G of FIG. 8, the adsorption time may be set to the maximum operation time of the dehumidifier 100; to thereby provide a configuration performing only the first operation mode. With the configuration like this, it is possible to provide stable air to the dehumidified space without switching the refrigerant flow path of the refrigerant circuit 10. Further, the number of times of switching in the flow path switch 14 can be reduced; and therefore, it is possible to suppress breakdown caused by increase of the number of times of opening and closing; to thereby provide the highly reliable dehumidifier 100.

Moreover, in the above-described Embodiment 2, the configuration to change the operation time map 65 based on the detection result of the wind speed sensor 3 is employed; however, the present invention is not limited thereto. For example, it may be possible to adopt a configuration that changes the operation time map 65 manually depending on a power-source voltage of the dehumidifier 100 or specification of the duct to be connected. Moreover, in Embodiment 2, the configuration that simply changes the operation time map 65 in accordance with the wind speed of any of the three levels of reference range, larger and smaller was employed; however, the adsorption time and the desorption time may be set in more details in accordance with the wind speed at the placement locations. Further, it may also be possible to detect reduction of the air volume from the operation state of the refrigerant circuit 10 and to change the operation time map 65. When the air volume is reduced, in general, heat exchange in the evaporator is suppressed, and a low-pressure pressure is decreased, and thereby SH in the evaporator is decreased. Therefore, it may be possible to adopt a configuration that determines increase and decrease of the air volume from decrease and increase of SH of the evaporator; and changes the operation time map 65.

Further, when the refrigerant pipe connection in the refrigerant circuit 10 is capable of switching between heating and cooling, and is capable of adjusting the heating amount, either series connection or parallel connection of the first heat exchanger 12a, the second heat exchanger 12b and the third heat exchanger 12c may be possible. Moreover, determination of whether or not the frost is formed on the first heat exchanger 12a and the second heat exchanger 12b is not limited to the configuration based on the detection result of the wind speed sensor 3. For example, it may be possible to provide a temperature sensor configured to detect the refrigerant temperature in the first heat exchanger 12a and the second heat exchanger 12b, to thereby determine the presence or absence of frost formation based on the detection result of the temperature sensor.

REFERENCE SIGNS LIST 1 air path 1a air inlet 1b air outlet 2 temperature/humidity sensor
3 wind speed sensor 4 controller 5 timer unit 6 storage unit
10 refrigerant circuit 11 compressor 12a first heat exchanger
12b second heat exchanger 12c third heat exchanger 13 pressure-reducing device 14 four-way valve 20 moisture adsorption member 30 air-sending machine 65 operation time map 100 dehumidifier

The invention claimed is:

1. A dehumidifier comprising:
a refrigerant circuit in which a compressor, a flow path switch configured to switch a refrigerant flow path, a first heat exchanger, a pressure-reducing device and a second heat exchanger are connected by piping;
a moisture adsorption member arranged between the first heat exchanger and the second heat exchanger and configured to adsorb moisture contained in air flowing in an air path and desorb the adsorbed moisture;
a fan configured to blow air in a space to be dehumidified into the air path, the fan causing the air to flow in order of the first heat exchanger, the moisture adsorption member and the second heat exchanger;
a controller configured to control the flow path switch;
a storage unit configured to store an operation time map used to control the flow path switch; and
a temperature and humidity detection unit configured to detect temperature and humidity in the space to be dehumidified,
the controller being configured to control the flow path switch to switch a first operation mode, in which the first heat exchanger is caused to serve as an evaporator and the second heat exchanger is caused to serve as a condenser to adsorb moisture by the moisture adsorption member, and a second operation mode, in which the first heat exchanger is caused to serve as a condenser and the second heat exchanger is caused to serve as an evaporator to desorb moisture adsorbed by the moisture adsorption member,
the operation time map associating temperature and humidity in the space to be dehumidified with a first time during which operation is performed in the first operation mode and a second time during which operation is performed in the second operation mode,
the controller being configured to acquire the first time and the second time corresponding to the temperature and the humidity detected by the temperature and humidity detection unit from the operation time map, and control the flow path switch in accordance with the acquired first time and second time.

2. The dehumidifier of claim 1, wherein
the refrigerant circuit further comprises a third heat exchanger arranged between the compressor and the flow path switch and configured to serve as a condenser, and
the third heat exchanger is arranged downstream of the second heat exchanger in the air path.

3. The dehumidifier of claim 1, wherein the controller is configured to acquire the first time and the second time based on the temperature and the humidity detected by the temperature and humidity detection unit during the operation in the first operation mode.

4. The dehumidifier of claim 1, further comprising:

a frost formation detection unit configured to detect frost formation on the first heat exchanger or the second heat exchanger, wherein, when the frost formation is detected by the frost formation detection unit, the controller is configured to control the flow path switch to switch from the first operation mode to the second operation mode, or switch from the second operation mode to the first operation mode.

5. The dehumidifier of claim 4, wherein the frost formation detection unit is configured to determine that there is the frost formation when reduction in speed of air flowing in the air path is detected.

6. The dehumidifier of claim 1, further comprising:
a wind speed detection unit configured to detect a speed of air flowing in the air path, wherein
the controller is configured to change the first time and the second time in the operation time map depending on a detection result of the wind speed detection unit.

7. The dehumidifier of claim 1, wherein
the controller is configured to change the first time and the second time in the operation time map depending on an operation status of the refrigerant circuit.

8. The dehumidifier of claim 1, wherein
the storage unit is configured to use the operation time map selected in accordance with a contribution ratio of the moisture adsorption member.

9. The dehumidifier of claim 1, wherein
the operation time map associates the first time and the second time such that the first time and the second time are shorter in the case where the temperature of the space to be dehumidified is high than in the case where the temperature of the space to be dehumidified is low.

* * * * *